(12) United States Patent
Chisnall

(10) Patent No.: US 6,326,899 B1
(45) Date of Patent: Dec. 4, 2001

(54) SHUTTER ASSEMBLY WITH SENSOR DEVICE, AND RELATED SENSOR DEVICE ASSEMBLY

(76) Inventor: David Chisnall, 3 Langley Lodge Gardens, Langley, Hampshire (GB), S045 1FZ ( * ) Notice: Subject to any disclaimer, the term of this patent is extended or adjusted under 35 U.S.C. 154(b) by 0 days.

(21) Appl. No.: 09/713,433

(22) Filed: Nov. 15, 2000

(30) Foreign Application Priority Data

Jul. 13, 2000 (GB) .................................................. 0017102

(51) Int. Cl.[7] .................................................. G08B 21/00
(52) U.S. Cl. .................. 340/686.1; 340/457; 340/545.3; 160/10; 296/24.1; 362/487
(58) Field of Search ................................ 340/457, 545.3, 340/686.1; 362/487; 296/24.1; 160/10, 127, 133

(56) References Cited

U.S. PATENT DOCUMENTS

| | | |
|---|---|---|
| 2,932,727 | 4/1960 | Larsen . |
| 3,759,056 | * 9/1973 | Graber . |
| 3,975,723 | 8/1976 | Bowling, et al. . |
| 4,232,309 | * 11/1980 | Dillitzer .............................. 340/547 |
| 4,281,320 | * 7/1981 | Rosenberg .......................... 340/547 |
| 4,593,491 | 6/1986 | Carlson, et al. . |
| 4,694,191 | 9/1987 | Segoshi . |
| 5,121,098 | 6/1992 | Chen . |
| 5,602,526 | 2/1997 | Read . |
| 5,713,621 | * 2/1998 | Krenkel et al. ..................... 340/547 |
| 6,085,825 | * 7/2000 | Swink et al. ....................... 160/133 |

OTHER PUBLICATIONS

AS Angus Sacol, Latch Bar Not Secure (LBNS) Installation Guide, LBNSIG Issue 1, Feb. 95.
AS America, Inc., Latch Bar Not Secure (LBNS) General Information and Installation Guide, LBNSIG Issue 1, May 95.
AS America Inc., Roller Shutters (Sales Literature), undated.
AS America, The Future Hinges on Century 2000 (Sales Literature), undated.
ASA America, a Division of Hansen International, Inc., AS America Roll–up Doors and Slide Systems (Sales Literature), undated.
AS America, Innovation and Quality in Roll–Up Doors and Equipment Carriers (Brochure), undated.

* cited by examiner

*Primary Examiner*—Daniel J. Wu
(74) *Attorney, Agent, or Firm*—Dority & Manning, P.A.

(57) ABSTRACT

A shutter assembly includes a structure which surrounds an opening and a shutter including a plurality of laths hingedly connected together at their longitudinal edges and moveable across the opening in a direction substantially normal to those longitudinal edges between an opened position and a closed position to respectively open and close the opening. A latch mechanism is operable to retain the shutter in the closed position. The latch mechanism includes at least one latch member mounted on the shutter and, for each latch member, at least one keeper mounted on the structure and which has a portion with which the respective latch member may be engaged to latch the shutter in the closed position. A sensor includes an emitter and a detector positioned such that when the latch member is engaged the signal transmitted by the emitter is reflected by the latch member and is received by the detector, and positioned such that when the latch member is not engaged the signal from the emitter is not received by the detector. A related sensor device assembly is also disclosed.

20 Claims, 3 Drawing Sheets

SHUTTER ASSEMBLY WITH SENSOR DEVICE, AND RELATED SENSOR DEVICE ASSEMBLY

BACKGROUND OF THE INVENTION

This invention relates to shutters and is concerned in particular with a sensor which registers if such a shutter is opened or closed by sensing whether the latch mechanism by which such a shutter is latched closed is engaged, and switching an electrical circuit accordingly.

U.S. Pat. No. 5,713,621 discloses a vehicle rolling shutter with door-ajar and compartment light switch which uses a magnetically operated switch and requires a magnet to be fitted to the shutter latch to indicate whether the shutter is closed and that the latch is engaged. Other known switch forms use mechanical switches that are operated by the latch while the latch is engaged, these switches having moving parts which can be affected by water and movement of the latch during use of the vehicle.

OBJECTIVES AND SUMMARY OF THE INVENTION

An objective of this invention is to provide a shutter with a latch sensor device, and a related sensor device assembly, where the sensor device has no moving parts and is less affected by water or the movement of the latch due to vehicle motion, and does not require the installation of a magnet on the shutter latch.

According to one aspect of this invention, there is provided a shutter assembly including a structure which surrounds an opening, a shutter which includes a plurality of laths hingedly connected together at their longitudinal edges and moveable across the opening in a direction substantially normal to those longitudinal edges between an opened position and a closed position to respectively open and close the opening, and a latch mechanism operable to retain the shutter in location in the closed position. The latch mechanism includes at least one latch member mounted on the shutter and, for each latch member, at least one keeper which is mounted on the structure and which has a portion with which the respective latch member may be engaged to latch the shutter in the closed position. A sensor is included having an emitter and a detector. The emitter transmits a signal which is then reflected by the latch member and received by the detector when the latch member is engaged, or in the absence of the latch member no signal is received by the detector.

The sensor may contain a second detector that only receives signals transmitted by sources other than the emitter which are also received by the first detector, the comparison of the signals received by both detectors precluding incorrect registration of the presence of the latch member. The signal may be in the form of, but not restricted to, light waves in the infrared spectrum.

Conveniently, the sensor can be totally contained within the keeper and can be used, with or without the use of an electrical relay switch included within or outside of the keeper, to operate a warning light or other electrical or electrically controlled items. A plurality of the latch mechanisms, keepers and sensors may be provided.

Another aspect of the invention includes a related sensor device assembly suitable for use, for example, in such a shutter assembly.

BRIEF DESCRIPTION OF THE DRAWINGS

Specific embodiments of this invention will now be described, by the way of example only, and with reference to the accompanying drawings, of which.

DETAILED DESCRIPTION OF THE PREFERRED EMBODIMENTS

Embodiments of the invention will now be described in detail with reference to examples shown in the figures. Each example is provided by way of explaining the invention, and not as a limitation of the invention. Various modifications and variations can be made in the invention without departing from the scope and spirit of the invention. For example, features illustrated or described with respect to one embodiment may be used in another embodiment to yield still a further embodiment.

Figure 6:
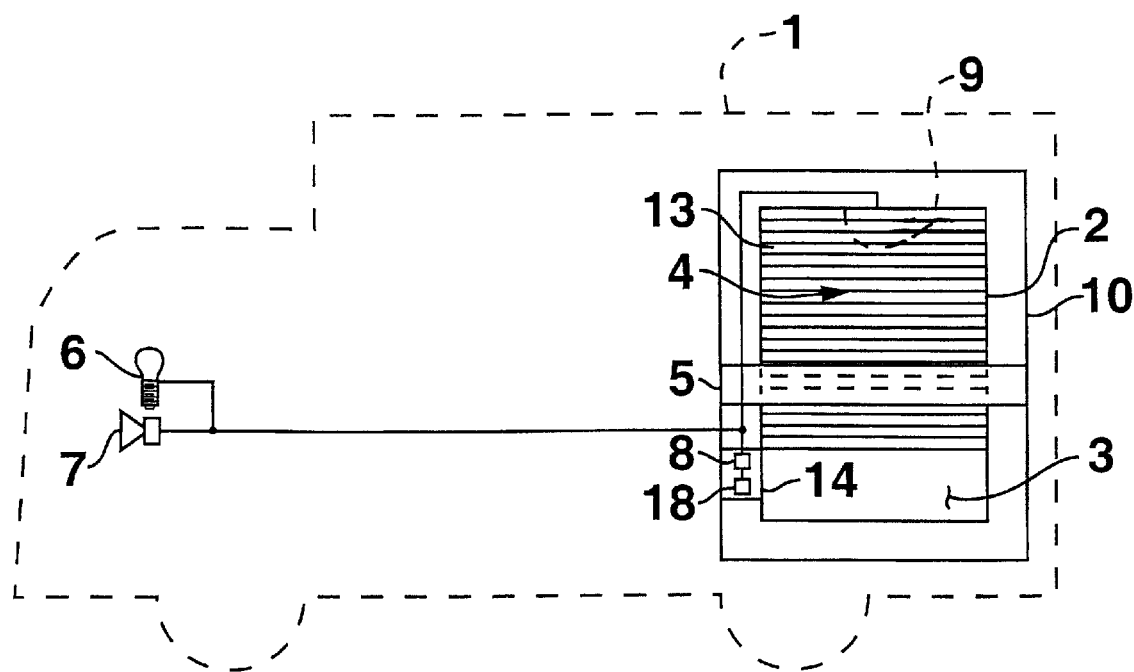
FIG. 6 is a diagrammatic illustration (not to scale) of interconnection between various components according to various aspects of the present invention.

As generally indicated in FIG. 6, a vehicle, 1 such as a fire engine, has an opening 2 which provides access to a storage compartment 3. The opening 2 is surrounded by a frame 10 (see also FIGS. 1–3) and is normally closed by a roller shutter 4. The roller shutter comprises a plurality of elongate laths 13 (see also FIGS. 1–3), which are hinged together along their longitudinal edges. For purposes of the present invention, any convenient hinge arrangement such as that which is described in British Patent No. 2,113,749, may be used. The lath at one end of the shutter 4 is fixed to a storage roller (not shown) which is mounted within the compartment 3 adjacent to and substantially parallel to the upper edge of the opening 2. The storage roller is spring loaded in the direction in which it must rotate to draw the shutter across the opening so as to open the opening, the shutter being wrapped around the roller as it is so drawn. A handle is provided on the outer surface of the shutter so that an operator can apply a load assisting the spring to open the shutter or to restrain opening movement of the shutter so that it does not open too quickly and can move the shutter against the spring loading to close it.

Figure 1:
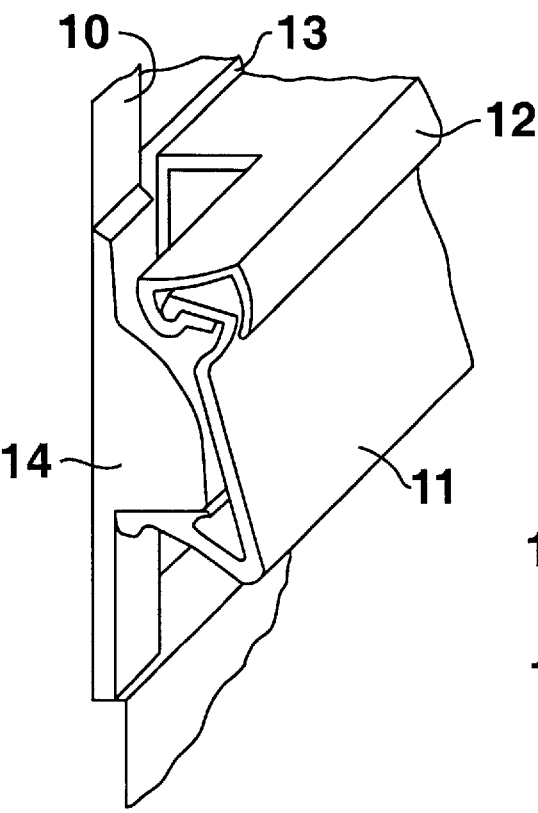
FIG. 1 is a fragmentary view in perspective showing the lower left hand corner of a shutter and a respective latch mechanism when the shutter is latched in its closed position, the latch mechanism being viewed from outside the opening at a location displaced from the opening and to the left of the opening.
Figure 2:
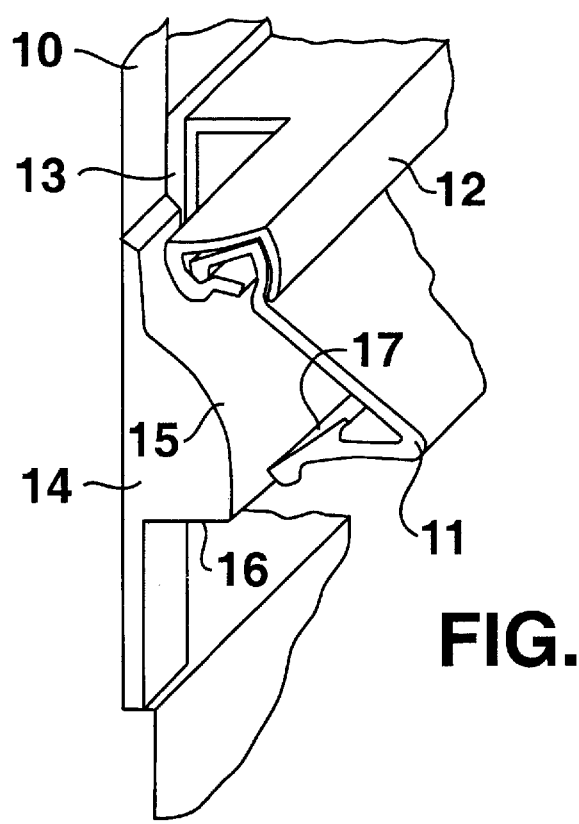
FIG. 2 is a view similar to FIG. 1 illustrating disengagement of the latch mechanism during initial opening of the shutter.
Figure 3:
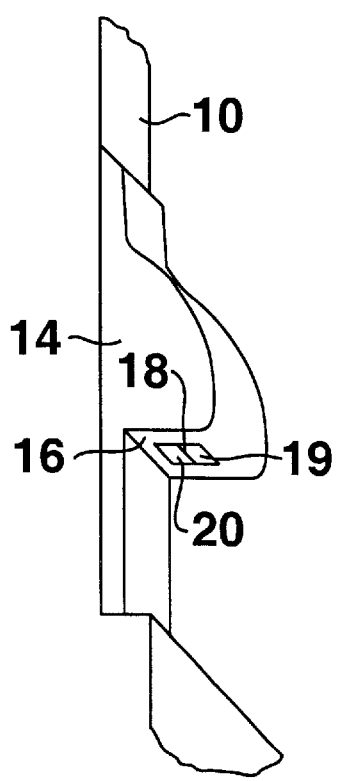
FIG. 3 is a view similar to FIGS. 1 and 2 illustrating a sensor within a keeper being viewed from outside the opening at a location displaced from the opening to the left and below the opening.

FIGS. 1–3 show a portion of the roller shutter 4 and a handle assembly 5 according to the present invention. As shown, the handle assembly 5 includes at least one latch member 11 which is pivotally mounted on a mounting bracket 12 which is secured to the outer surface of one lath 13 of the roller shutter 4 adjacent the respective end of that lath 13. The latch member 11 is in a vertical plane which also contains for the latch member 11 a keeper 14 which is fixed to the frame 10 alongside the opening 2 (see FIG. 3). The keeper 14 projects outwardly from the frame 10 parallel to the edge of the opening 2. The upper surface of the keeper 14 forms a ramp 15 which slopes downwardly and outwardly from the frame 10. The keeper 14 forms a bight or indention 16 below the ramp 15. The horizontal depth of the bight 16 corresponds to the respective stop surface 17 of the latch member 11. The geometrical form of each latch member 11 is such that when the stop surface 17 is located within the respective bight 16 (as shown in FIG. 1) the shutter is latched against upward movement.

Figure 4:
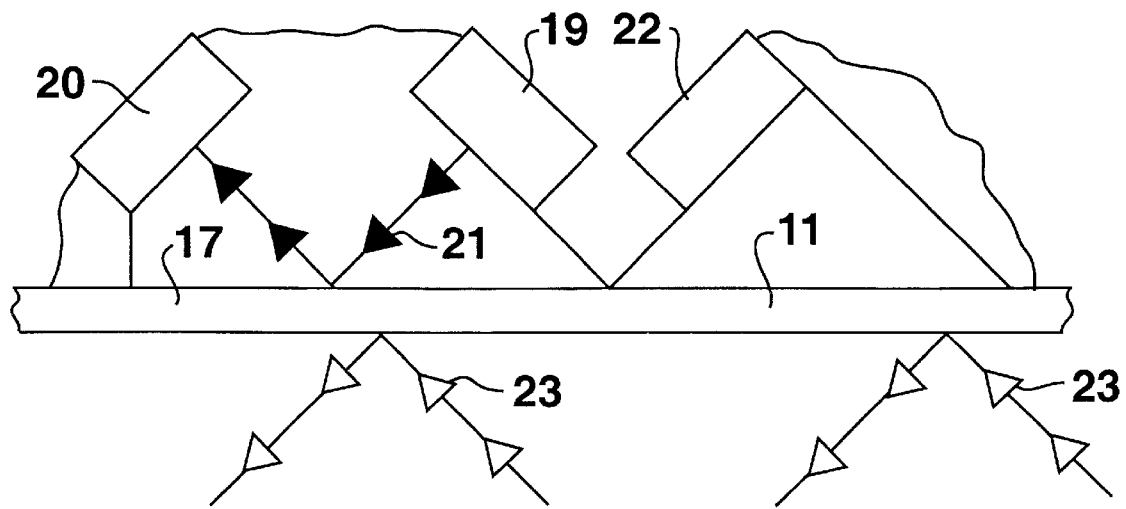
FIG. 4 is a diagrammatic illustration of the sensor with the latch member present and indicates the path of signals.
Figure 5:
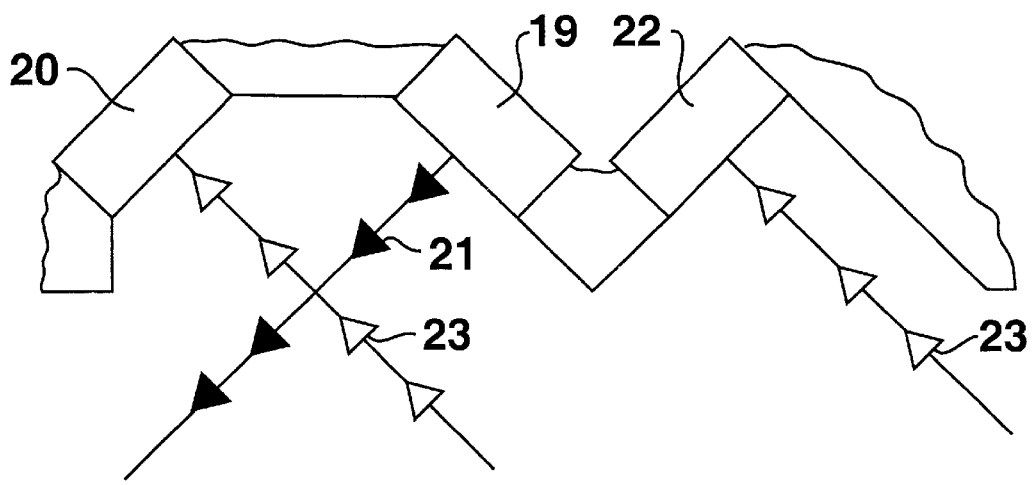
FIG. 5 is a diagrammatic illustration similar to FIG. 4 of the sensor with the latch member absent.

According to another aspect of the invention, within the keeper 14 there is a sensor 18 which includes an emitter 19 and a detector 20. When the stop surface 17 engages with the respective bight 16, the signal 21 transmitted by the emitter 19 is reflected by the stop surface 17 and is then received by the detector 20 as shown in FIG. 4. The detector 20 upon reception of the signal 21 allows the passing of an electrical current through an electrical circuit that is connected to the detector 20. When the respective latch member 11 is not present in the bight 16, the signal 21 transmitted by the emitter 19 is not received by the detector 20 (see FIG. 5) and the electrical current in the circuit connected to the detector 20 is not permitted to pass by the detector 20.

As shown in FIG. 6, the circuit connected to the detector 20 may also be connected to an indicator light 6 on the dashboard of the vehicle 1 such that the light is illuminated when the respective latch member 11 is registered as not being present, thereby indicating that the shutter 4 either is open or is closed and not latched. An audible warning generator 7 controlled or generated by electrical means may be included together with or in place of the warning light 6.

In certain embodiments, substantially as previously described and as shown in FIGS. 1 to 6, where the form of the signal 21 may also be present from sources other than the emitter 19, the sensor 18 consists an emitter 19 and a first detector 20 and a second detector 22. The second detector 22 is included and positioned such that it does not receive the signal transmitted by the emitter 19 or any other extraneous signals 23 while the latch member 11 is present in the bight 16 (see FIG. 4). The position of the second detector 22 also is such that when the latch member 11 is not present the second detector 22 receives any extraneous signals 23 that are also received by the first detector 20. Thus, signals 23 not originating from the emitter 19 but received by the first detector 20 can be cancelled by comparing the signals 23 received by the first detector 20 and signals 23 received by the second detector 22 by electronic means. A false indication of registration of the latch member 11 may therefore be avoided (see FIG. 5).

In particular embodiments, substantially as previously described and as shown in FIGS. 1 to 6, the signal 21 may be formed by light waves in the infrared spectrum.

In another embodiment, substantially as previously described and as shown in FIGS. 1 to 6, the circuit connected to the detector 20 may be connected, either directly or by the use of an electrical relay switch 8 which may be contained within the respective keeper or external to it, to at least one light 9 within the storage compartment 3 closed by the shutter 4. The circuit connected to the detector 20 is connected such that the at least one light 9 is illuminated when the respective latch member 11 is registered as not being engaged thereby illuminating the storage compartment 3 when the shutter 4 is opened. Electrically controlled items (not shown) may also be used in addition to or in place of the at least one light 9.

Thus, there is disclosed an improved shutter assembly with sensor device, and related sensor device assembly. Those skilled in the art will appreciate numerous modifications which can be made without departing from the scope and spirit of the present invention. The appended claims are intended to cover such modifications.

What is claimed is:

1. A shutter assembly comprising:

a structure which surrounds an opening;

a shutter including a plurality of laths hingedly connected together at their longitudinal edges and moveable across the opening in a direction substantially normal to the longitudinal edges between an opened position and a closed position to respectively open and close the opening;

a latch mechanism operable to retain the shutter in the closed position, the latch mechanism including at least one latch member mounted on the shutter and, for each latch member, at least one keeper mounted on the structure and which has a portion with which the respective latch member may be engaged to latch the shutter in the closed position; and a sensor including an emitter and a detector positioned such that when the latch member is engaged the signal transmitted by the emitter is reflected by the latch member and is received by the detector, and positioned such that when the latch member is not engaged the signal from the emitter is not received by the detector.

2. A shutter assembly according to claim 1, wherein a second detector is included and positioned such that it does not receive the signal transmitted by the emitter while the latch member is engaged, and positioned such that when the latch member is not engaged the second detector receives extraneous signals also received by the first detector, thereby allowing extraneous signals received by the first detector to be cancelled by comparing the signals received by both the first and second detectors.

3. A shutter assembly according to claim 1, wherein the signal transmitted by the emitter and received by the detector is composed of light in the infrared spectrum.

4. A shutter assembly according to claim 1, wherein the sensor is housed within the keeper.

5. A shutter assembly according to claim 1, including more than one keeper and more than one sensor, each keeper containing a respective one of the sensors.

6. A shutter assembly according to claim 1, wherein the sensor is connected to an indicator light which is switched on responsive to the detector not receiving the signal from the emitter.

7. A shutter assembly according to claim 1, wherein the sensor is connected to at least one light disposed within the structure, the at least one light being switched on responsive to the detector not receiving the signal from the emitter.

8. A shutter assembly according to claim 1, further including an electrical relay switch connected to the sensor for switching on a light when the latch member is not engaged.

9. A shutter assembly according to claim 8, wherein the relay switch and the sensor are both incorporated within the keeper.

10. A shutter assembly according to claim 1, wherein the sensor is connected to an audio indicator which is switched on responsive to the detector not receiving the signal from the emitter.

11. A shutter assembly according to claim 1, wherein the shutter assembly is mounted to a vehicle.

12. A sensor device assembly for indicating whether an opening closeable by a shutter is open or closed, a latch mechanism being mounted on the shutter and including a latch member, and a keeper being mounted to a structure adjacent the opening, the latch member positionable in an engaged position relative to the keeper when the opening is closed by the shutter, the sensor device assembly comprising:

an emitter disposed in the keeper for emitting a signal; and a detector disposed in the keeper for receiving the signal via reflection of the signal off the latch member only if the latch member is in the engaged position.

13. The senor device assembly according to claim 12, wherein the signal is composed of light in the infra-red spectrum.

14. A sensor device assembly according to claim 12, wherein a second detector is included and positioned such that it does not receive the signal transmitted by the emitter while the latch member is in the engaged position, and positioned such that when the latch member is not engaged the second detector receives extraneous signals also received by the first detector, thereby allowing extraneous signals received by the first detector to be cancelled by comparing the signals received by both the first and second detectors.

15. A sensor device assembly according to claim 12, including more than one keeper and more than one sensor, each keeper containing a respective one of the sensors.

16. A sensor device assembly according to claim 12, wherein the sensor is connected to an indicator light which is switched on responsive to the detector not receiving the signal from the emitter.

17. A sensor device assembly according to claim 12, wherein the sensor is connected to at least one light fitted in a position within the boundaries of the structure and behind the closed shutter, the at least one light being switched on responsive to the detector not receiving the signal from the emitter.

18. A sensor device assembly according to claim 12, firther including an electrical relay switch connected to the sensor for switching on a light when the latch member is not engaged.

19. A sensor device assembly according to claim 18, wherein the relay switch and the sensor are both incorporated within the keeper.

20. A sensor device assembly according to claim 12, wherein the sensor is connected to an audio indicator which is switched on responsive to the detector not receiving the signal from the emitter.

* * * * *